United States Patent [19]
Yamato et al.

[11] Patent Number: 5,931,420
[45] Date of Patent: Aug. 3, 1999

[54] DEPLOYABLE TRUSS STRUCTURE

[75] Inventors: Mitsuteru Yamato; Jun Nakagawa; Hiroaki Tsunoda; Kenichi Hariu, all of Tokyo, Japan

[73] Assignees: Mitsubishi Denki Kabushiki Kaisha; Advanced Space Communications Research Laboratory, both of Tokyo, Japan

[21] Appl. No.: 09/025,150

[22] Filed: Feb. 18, 1998

[30] Foreign Application Priority Data

Feb. 24, 1997 [JP] Japan .................................. 9-039271

[51] Int. Cl.⁶ ...................................... B64G 1/10
[52] U.S. Cl. ...................... 244/159; 52/81.2; 52/DIG. 10
[58] Field of Search ............................... 244/159, 158 R; 52/81.2, 646, 108, DIG. 10

[56] References Cited

U.S. PATENT DOCUMENTS

| | | | |
|---|---|---|---|
| 3,854,255 | 12/1974 | Baker | 52/DIG. 10 |
| 3,897,164 | 7/1975 | Dodino | 52/DIG. 10 |
| 5,014,484 | 5/1991 | Tanizawa et al. | |
| 5,623,790 | 4/1997 | Lalvani | 52/DIG. 10 |
| 5,845,451 | 12/1998 | Tolentino | 52/646 |

FOREIGN PATENT DOCUMENTS

| | | |
|---|---|---|
| 61-261197 | 11/1986 | Japan . |
| 2-136400 | 5/1990 | Japan . |
| 6-92298 | 4/1994 | Japan . |

*Primary Examiner*—Galen L. Barefoot
*Attorney, Agent, or Firm*—Burns, Doane, Swecker & Mathis, LLP

[57] ABSTRACT

An deployable truss structure is herein disclosed in which the deterioration of an deployable reliability with the increase in the number of constitutional parts is prevented and in which even if the number of the mechanical parts of the whole structure is increased, a stable deployable reliability is established with regard to one deploying operation of the structure. A dividable asynchronous deployable truss structure is constituted of a plurality of segments and a segment binding deployable truss structure. The dividable asynchronous deployable truss structure independently carries out the deployment as one deployment unit comprising the segment and two side structures in the segment binding deployable truss structure directly bound thereto for every deployment unit, whereby the number of parts involved in one deploying operation can be decreased and a high deployment reliability can be ensured.

12 Claims, 16 Drawing Sheets

DEPLOYABLE TRUSS STRUCTURE

BACKGROUND OF THE INVENTION (1) Field of the Invention

The present invention relates to a large structure for use in outer space, i.e., an deployable (expandable) truss structure which can be used in a large antenna, a space station or the like. In addition, the deployable truss structure can be utilized as a portable temporary emergency structure on the earth, the moon, Mars or the like.

(2) Description of the Related Art

A structure for outer space can be carried as a payload in to space by a rocket to be launched such as an H-II rocket. The volume and weight of the payload are limited by the carrying power of the rocket to be launched, and therefore the structure must be designed so as to be as lightweight and as compact as possible. In the case of a truss structure which is a typical example of a large space structure, the limitation of the volume is more important than that of the weight. On the basis of the above background, much attention has been paid to an deployable truss structure, as a promising space structure, whose volume can be decreased by folding it at the time of the launch and which can be deployed in space after the launch to take a final formation.

In general, the deployable truss structure is constituted so as to form one large deployable truss structure in which deployable members called cells, each comprising a plurality of side structures foldable in one plane, are periodically joined to each other, while the adjacent side structures hold on to each other in common. In order to enlarge the deployable truss structure, the following two means can be considered. One of the means is to enlarge the size of the above cells when they are deployed, and the other is to increase the number of cells.

A typical example of the deployable truss structure is a hexalink truss 1. FIG. 11 shows an overall constitutional view of the hexalink truss 1, and FIG. 12 shows a hexagonal pillar cell 2 constituting the hexalink truss 1. As shown in FIG. 12, the cell 2 is constituted by joining the same side structures 3 in a circular form. FIG. 13 shows a constitutional view of the side structure. As shown in FIG. 13, an upper foldable member 5 is bound to upper portions of two vertical members 4 so as to be bridged between them. The upper foldable member 5 is foldable at its center position, and it is bound to the vertical member 4 and an upper foldable member end portion 6 via a hinge. The upper foldable member 5 is rotatable relative to the vertical member 4 in a plane including a synchronous mechanism 7. Furthermore, the upper foldable member end portion 6 is provided with a helical spring 8, which is an deployable drive source of the side structure 3. In addition, a slide hinge 9 is bound to the lower portion of each of the two vertical members 4, and this hinge is movable along the vertical member 4. The slide hinge 9 is bound, via the synchronous mechanism 7, to the upper portion of the vertical member 4 which is different from the vertical member 4 which can move by itself. The synchronous mechanism 7 comprises two slant members which are bound to each other via a hinge so as to be relatively rotatable at a center portion 10. Moreover, a lower end portion 11 of this synchronous mechanism 7 is bound to the vertical member 4 via the slide hinge 9, and in the plane including the synchronous mechanism 7, the vertical member 4 and the synchronous mechanism 7 are bound to each other so as to be relatively rotatable. Furthermore, a lower foldable member 12 is foldable at its center position as in the case of the upper foldable material 5, and the lower foldable material 5 is bound to the vertical member 4 via the slide hinge 9 so as to be rotatable relative to the vertical member 4 in the plane including a synchronous mechanism 7.

The side structure 3 having the above-mentioned member constitution can be deployed, taking formations shown in FIG. 14A to FIG. 14C. That is to say, by torque generated by the helical spring 8, the upper foldable member 5 is opened, and simultaneously, force in a parallel direction acts on the two vertical members 4, so that they move in the parallel direction. With this movement, the synchronous mechanism 7 bound to the vertical members 4 is opened, and simultaneously, the slide hinges 9 bound to the synchronous mechanism 7 slide forward along the vertical members 4 and the lower foldable members 12 are also opened with the movement in the parallel direction of the vertical members 4. Through the above steps, the side structure 3 can accomplish the deploying operation in one plane.

Each cell is constituted by joining a plurality of the side structures in a circular form, but since the adjacent side structures constituting the cell mutually hold some of the movable parts in common, all of the side structures in the cell can synchronously carry out the deploying operation. In the case of the above hexalink truss 1, the adjacent side structures 3 in the cell hold the vertical members 4 and the slide hinges 9 in common, whereby all of the side structures 3 in the cell can synchronously carry out the deploying operation. FIG. 15 shows a formation state in the middle of the deployment of the cell. Therefore, the hexalink truss 1 is the deployable truss structure in which a plurality of the cells 2 are bound to each other, holding all of the adjacent side structures 3 in common, and therefore, in the deployment process of the hexalink truss 1, all of the side structures 3 constituting the hexalink truss 1 can synchronously be deployed.

The feature of such an deployable truss structure resides in that the side structures of all the adjacent cells are held in common among the adjacent side structures themselves. Accordingly, such an deployable truss structure has characteristics that under mechanically ideal conditions no looseness of the hinges is present, and all of the deployable mechanisms constituting the structure can be synchronously deployed during the deploying operation. Therefore, in the case that the number of the cells regarding one deploying operation, i.e., the number of the movable constitutional parts is increased for the purpose of the enlargement of an antenna, it is necessary to significantly increase the movable reliability of each of the mechanical parts. In other words, the deployment performance depends on certain design factors and there is a problem that the enlargement of the deployable truss structure is difficult owing to the increase in the number of deployable constitutional parts.

SUMMARY OF THE INVENTION

An object of the present invention is to provide a synchronous deployable truss structure in which the deterioration of the deployable reliability with the enlargement of a structure, i.e., the increase in the number of constitutional parts which is a drawback of the synchronous deployable truss structure is prevented, and in which even if the number of the mechanical parts of the whole structure is increased, a stable deployable reliability is established by decreasing the number of parts involved in one deploying operation.

Furthermore, another object of the present invention is to provide an deployable truss structure in which another drawback of the synchronous deployable truss structure, i.e., a drawback that if non-deployable truss structure parts are present, the whole structure is distorted and it can no longer function as the structure, is eliminated, and even if the non-deployable truss structure parts are present, it can partially function as the structure.

For the purpose of achieving the above objects, an deployable truss structure of the present invention comprises a plurality of segments constituted by binding a plurality of hexagonal pillar cells, each comprising six side structures which are foldable in one plane and which are bound to each other in a circular form, to a plurality of tetragonal pillar cells each comprising four side structures which are foldable in one plane and which are bound to each other in a circular form, and a binding deployable element for binding a plurality of the segments to each other, wherein the deployable truss structure deploys one of the segments and the binding deployable truss structure as one independent deployable unit. In an deploying process, the respective deployable units can physically independently carry out the deploying operation in succession. That is to say, the deployable units can carry out the deploying operation in an asynchronous manner, and finally, all the extendable units can deploy. By taking such an deploying formation, the number of mechanical parts involved in one deploying operation can be decreased to ensure the movement reliability of the deployable truss structure. The respective deployable units can independently deploy, and therefore, even if some of the deployable units are not deployable, the others are deployable. Hence, the structure can achieve its function.

In addition, the deployable truss structure of the present invention comprises a plurality of segments constituted by binding a plurality of hexagonal trapezoid cells, each comprising six side structures which are foldable in one plane and which are bound to each other in a circular form, to a plurality of tetragonal trapezoid cells comprising four side structures which are foldable in one plane and which are bound to each other in a circular form, and a binding deployable element for binding a plurality of the segments to each other, wherein the deployable truss structure deploys one of the segments and the binding deployable element as one independent deployable unit. By constituting the respective cells in the form of the trapezoid, the whole structure can possess curvature after the deployment. Therefore, the structure can be applied to, for example, an antenna or the like.

DETAILED DESCRIPTION OF THE INVENTION

EMBODIMENT 1

Figure 1:
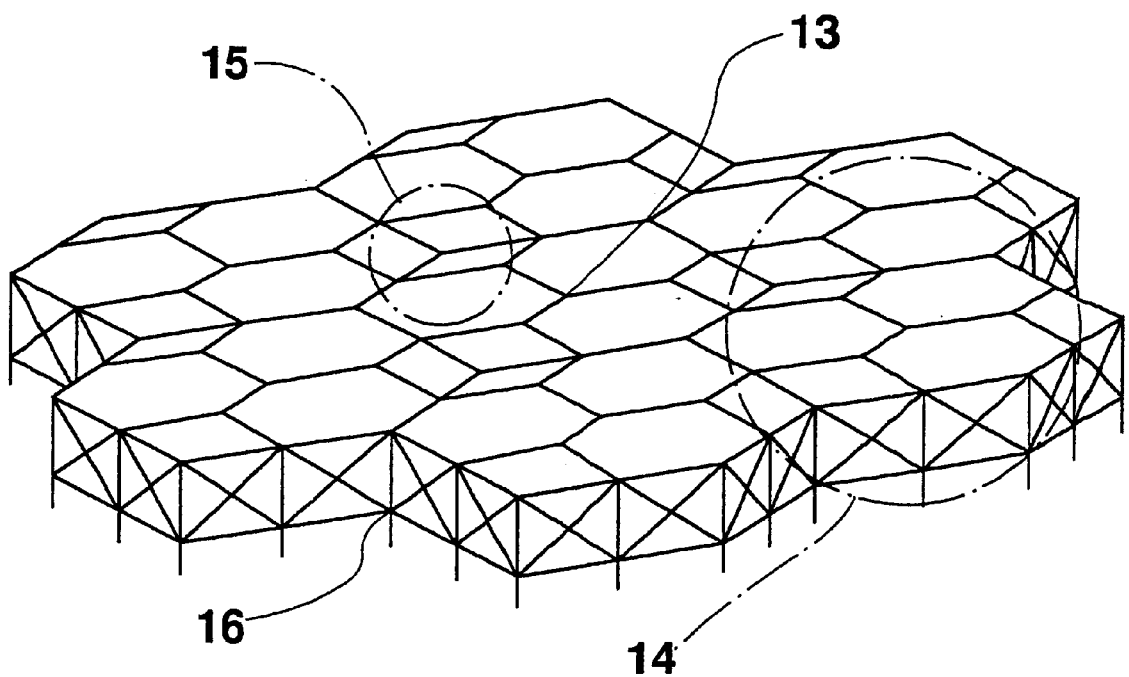
FIG. 1 shows the overall appearance of a dividable non synchronous deployable truss structure according to the present invention.
Figure 2A:
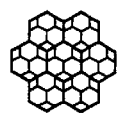
FIGS. 2A, 2B, 2C, 2D and 2E show the deploying behavior of the deployable truss structure shown in FIG. 1.
Figure 2B:
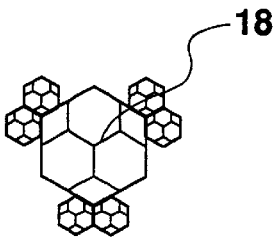
Figure 2C:
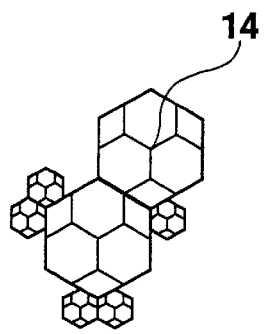
Figure 2D:
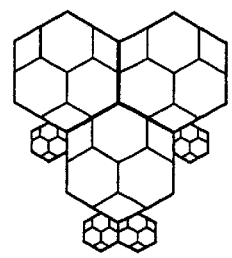
Figure 2E:
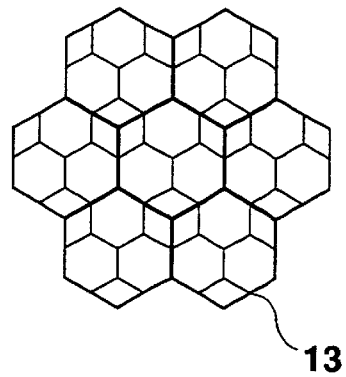

FIG. 1 is a whole constitutional view regarding an embodiment of the present invention. As shown in FIG. 1, a dividable asynchronous deployable truss structure 13 is constituted by binding three hexagonal pillar cell structures 2 to each other, binding two tetragonal pillar cell structures 17 to their outer peripheries to form a segment structure 14, and then binding the segment structures 14 to each other via segment binding deployable truss structures 15. However, the segment structure 14 which is the center of the dividable asynchronous deployable truss structure shown in FIG. 1 comprises three hexagonal pillar cell structures 2 bound to each other and three segment binding deployable elements 18 bound to their outer peripheries. The number of segment structures constituting the dividable asynchronous deployable truss structure 13 and the number of segment binding deployable elements are optional. Furthermore, the numbers of the hexagonal pillar cell structures 2 and the tetragonal pillar cell structures 17 constituting the segment structure 14 are not particularly limited, so long as the outer periphery of the segment and the side structures in the segment binding deployable elements which are directly bound to the segment is hexagonal when seen from the above of the cell.

FIGS. 2A to 2E show the deploying behavior of the dividable asynchronous deployable truss structure 13 according to the present invention, and these drawings show the states of the dividable asynchronous deployable truss structure 13 shown in FIG. 1 when seen from above. As shown in FIGS. 2A to 2E, when the deployable truss structure is folded, all of the segments 14 and the segment binding deployable truss structures 15 are folded into a small size, and afterwards, one segment 14 and two side structures 3 of the segment binding deployable truss structure 15 directly bound to this segment carry out the deploying operation in succession as one deployment unit for every deployment unit. In the case of the dividable asynchronous deployable truss structure 13 shown in FIGS. 2A to 2E, the central segment 18 and the side structure directly bound to the central segment 18 in the segment binding deployable truss structures bound thereto first start and complete the deployment in order to avoid mutual physical interference of the adjacent deployment units in an deploying operation process. Afterwards, the segments 14 bound to the central segment 18 via the segment binding deployable truss structures 15 and non-deployed portions of the segment binding deployable truss structures 15 start and complete the deployment independently in succession for every deployment unit. In the case of the dividable asynchronous deployable truss structure 13 shown in FIGS. 2A to 2E, the deployment order of the peripheral segments is totally optional. When the deploying operation of all of the segments 14 and the segment binding deployable truss structures 15 is completed, the dividable asynchronous deployable truss structure 13 of the present invention is in a finally deployed state.

Figure 3A:
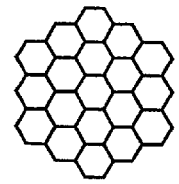
FIGS. 3A, 3B and 3C show the deploying behavior of the synchronous deployable truss structure regarding a relevant technique, with the deployable truss structure seen from the above.
Figure 3B:
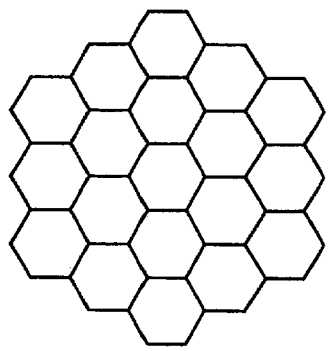
Figure 3C:
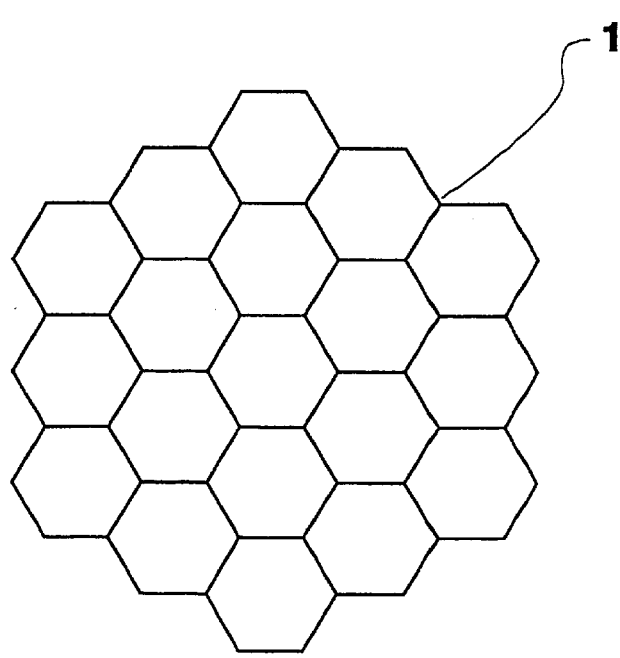
Figure 11:
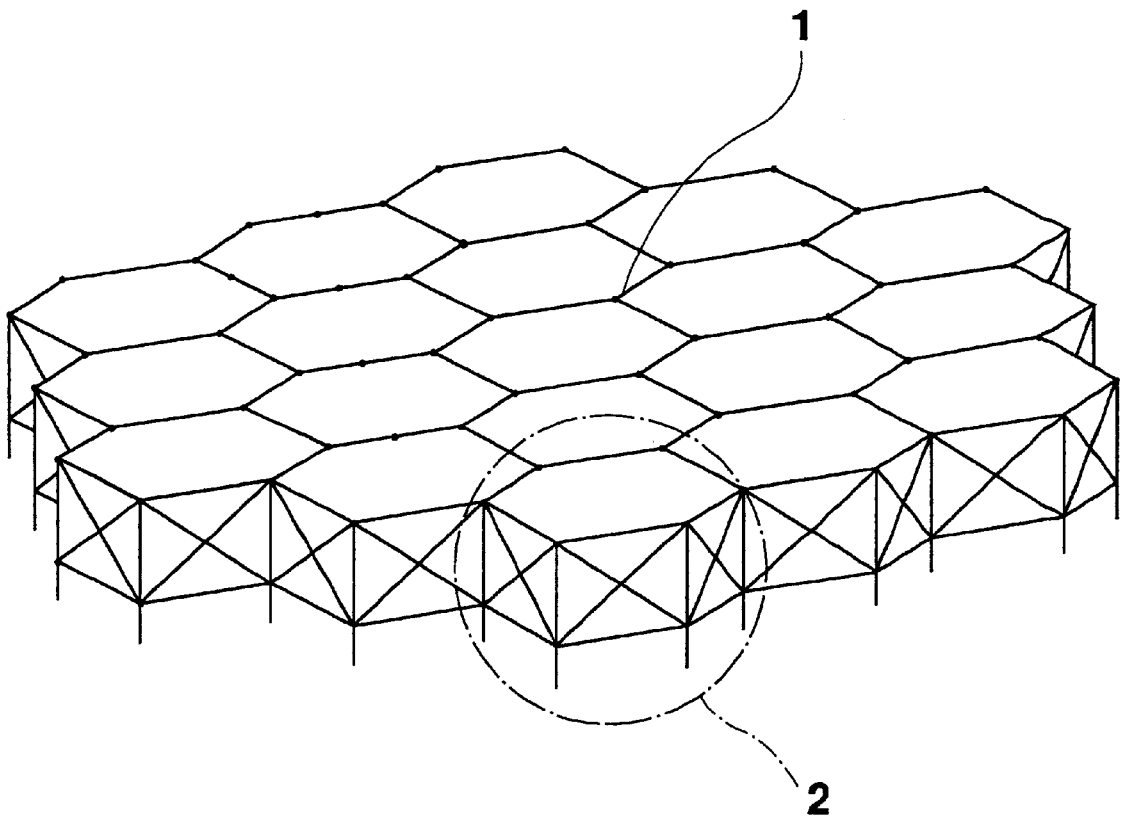
FIG. 11 is a constitutional view of a hexalink truss structure which is an deployable truss structure of a relevant technique.

FIG. 3 shows the deploying behavior of the synchronous deployable truss structure regarding a relevant technique for the comparison with that of the dividable asynchronous deployable truss structure 13 of the present invention. The same drawing shows the state of the hexalink truss 1 shown in FIG. 11 when seen from above. As described above, this synchronous deployable truss structure holds all of the side structures 3 of the adjacent cells in common, and all of the members and mechanisms synchronously carry out the deployment. Therefore, the number of the parts involved in one deploying operation is relatively large.

Figure 4:
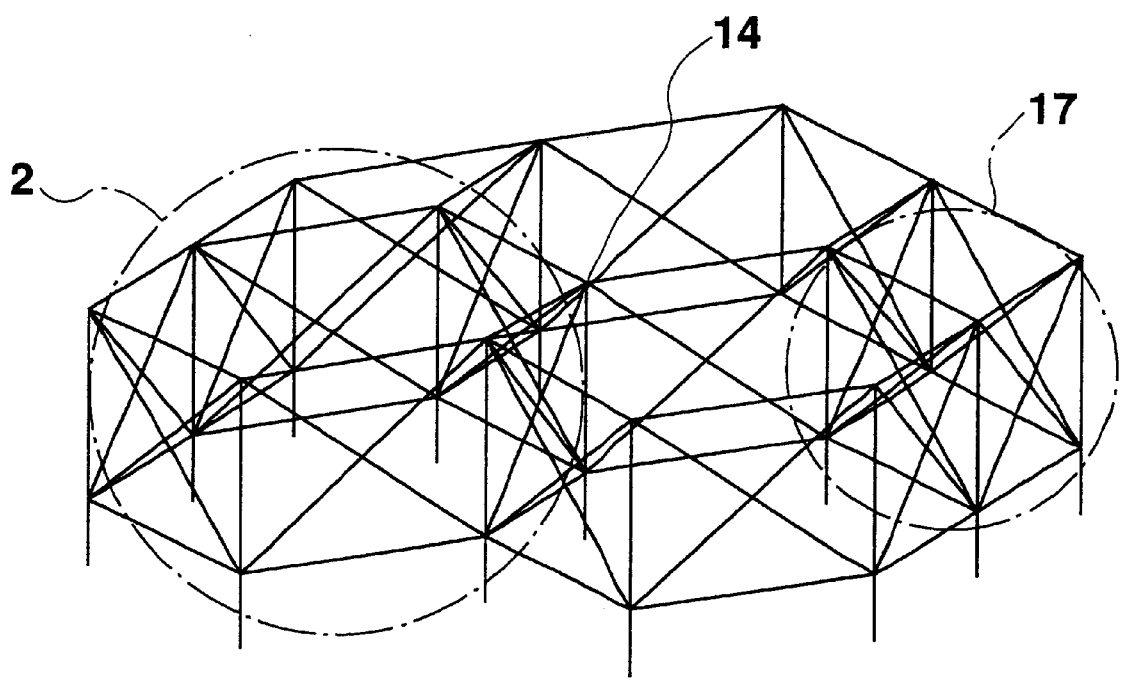
FIG. 4 is a constitutional view of a segment structure in which three hexagonal pillar cells and two triangular pillar cells are combined.
Figure 5:
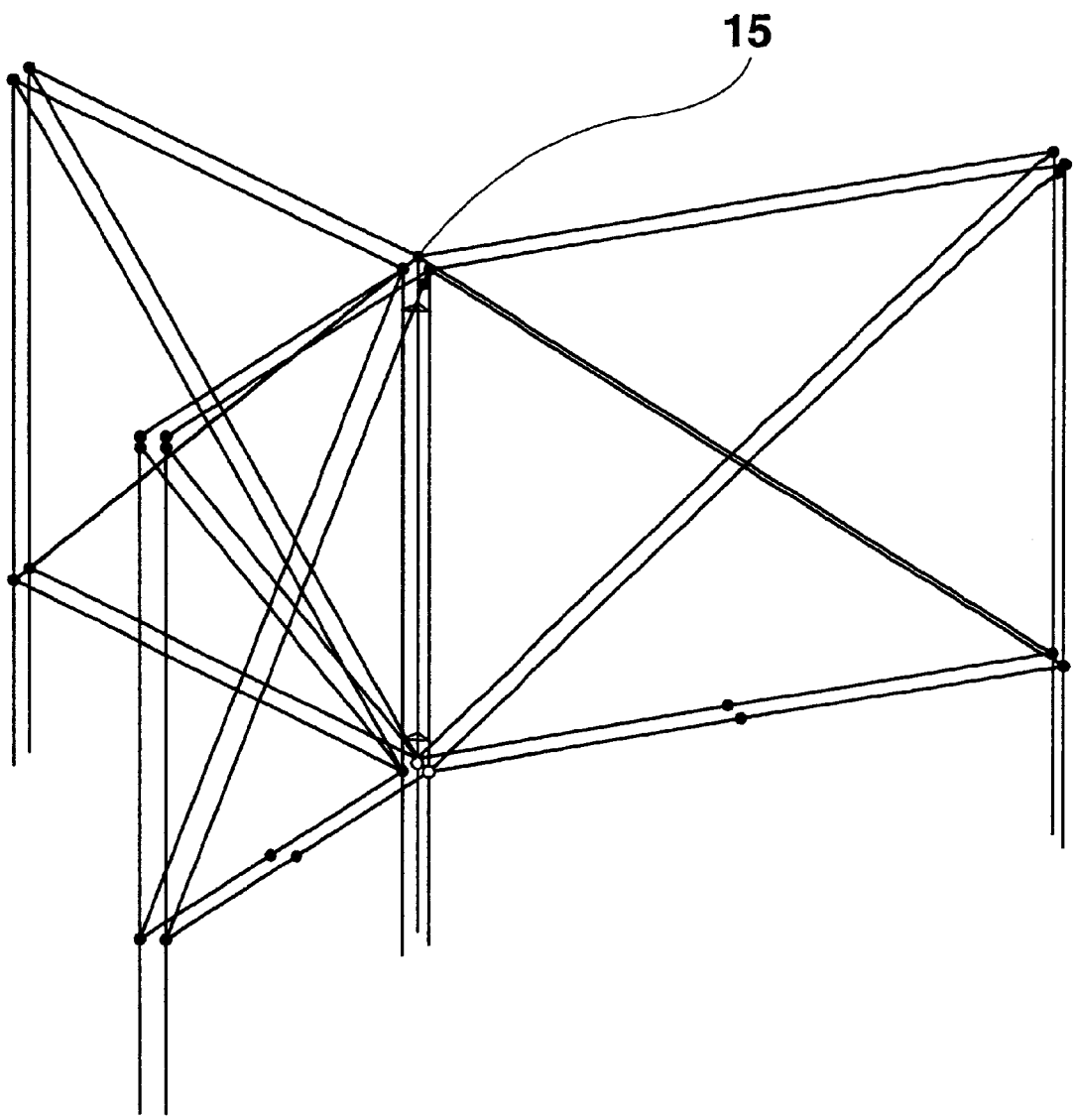
FIG. 5 is a constitutional view of a segment binding deployable truss structure element.
Figure 6A:
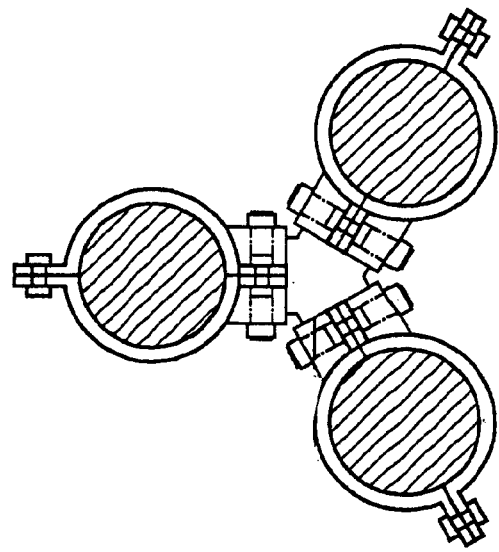
FIG. 6A is a sectional view showing a binding state of side structures constituting the segment binding deployable element.
Figure 6B:
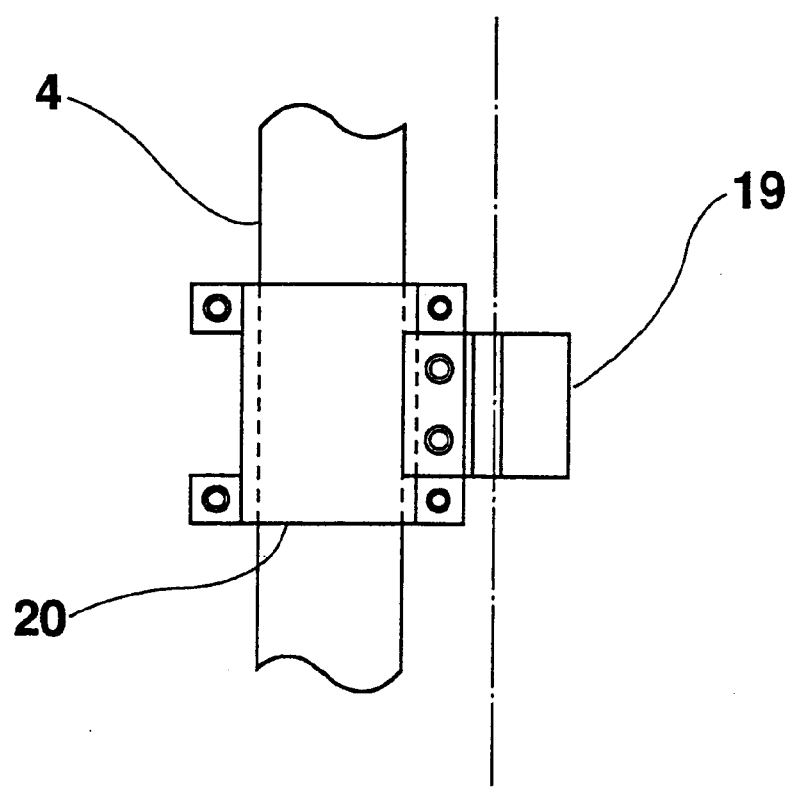
FIG. 6B is a side view showing a binding state of the side structures constituting the segment binding deployable element.
Figure 12:
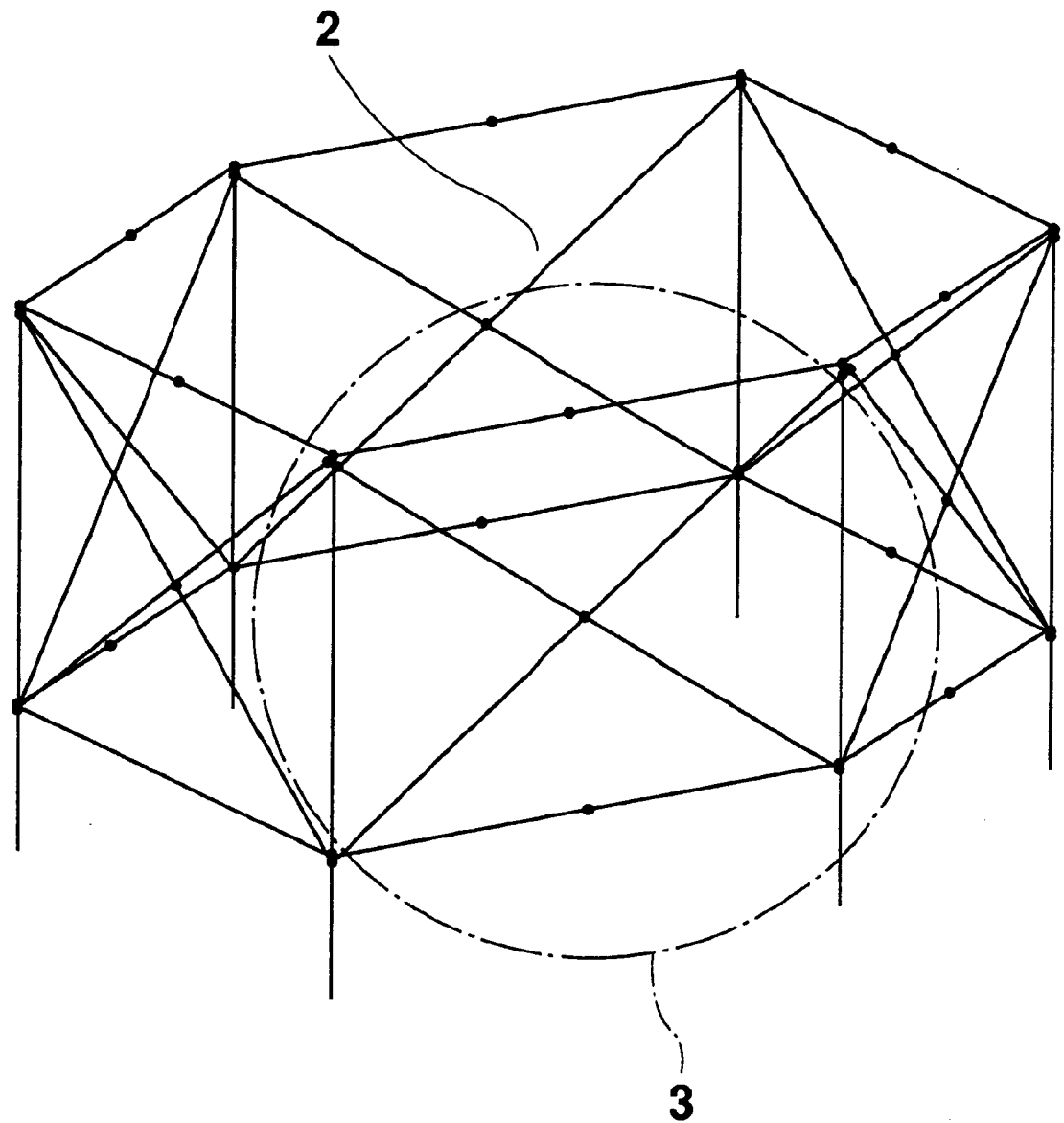
FIG. 12 is a constitutional view of a hexagonal pillar cell of a relevant technique which comprises 6 side structures bound to each other in a circular form.
Figure 13:
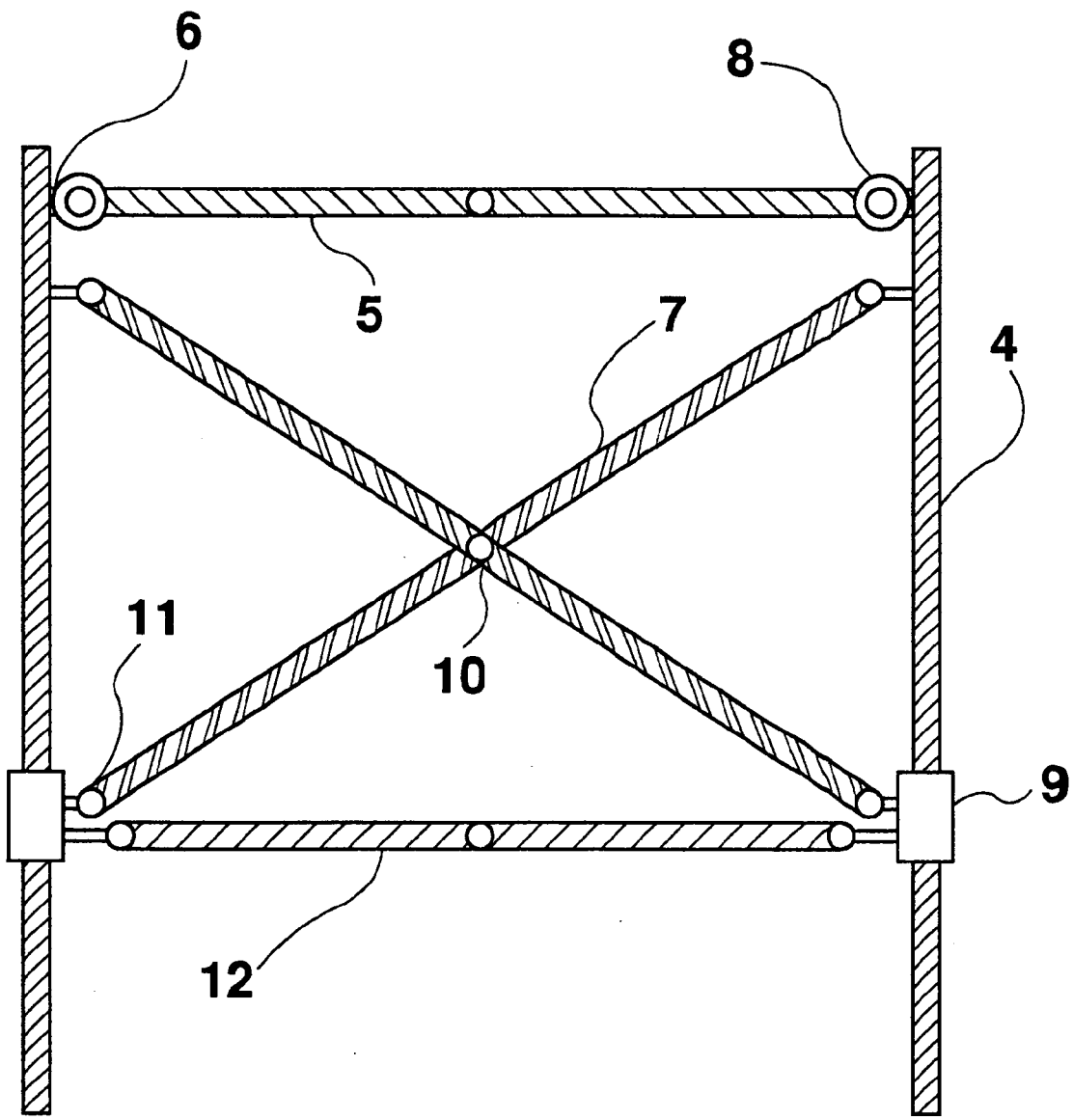
FIG. 13 is a constitutional view of the side structure constituting the cell of a relevant technique.
Figure 14A:
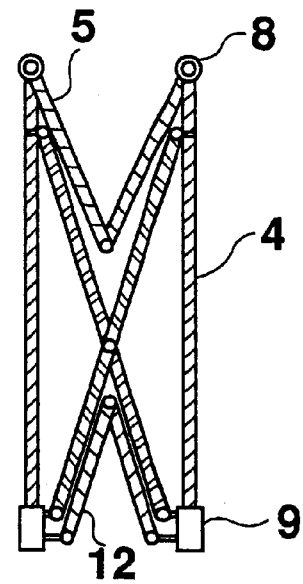
FIGS. 14A, 14B and 14C show the deploying behavior of the side structure regarding a relevant technique.
Figure 14B:
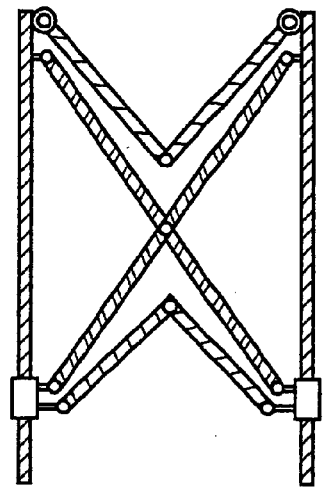
Figure 14C:
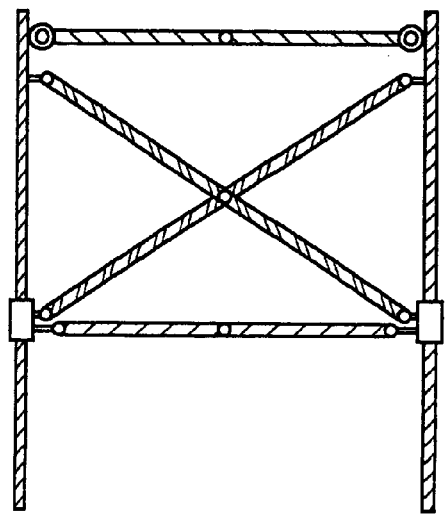
Figure 15:
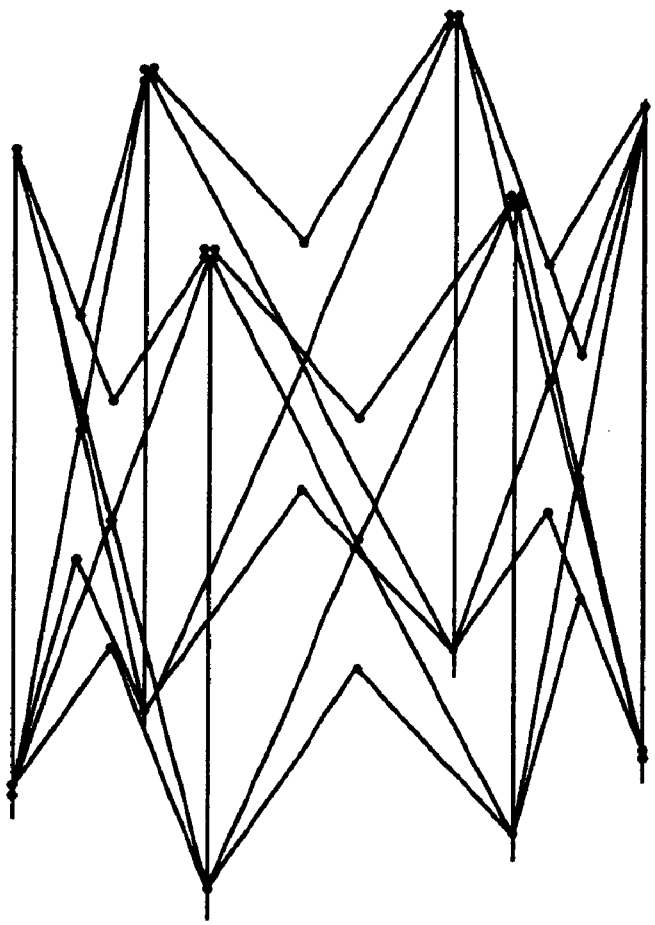
FIG. 15 is an illustrative view of a hexagonal pillar truss of a relevant technique in the middle of the deployment.

FIG. 4 shows the segment 14 in which three hexagonal pillar cells 2 and two tetragonal pillar cells 17 are combined. The respective hexagonal pillar cells 2 axially symmetrically bind around one side structure vertical member 4, holding the adjacent side structures 3 in common. A hexagonal pillar cell 20 corresponds to a combination of four side structures 3 in FIG. 12, and it binds to the side structures adjacent to the outer peripheries of three bound hexagonal pillar cells 2, holding them in common. Furthermore, FIG. 5 shows a constitutional view of the segment binding deployable truss structure element 15. The segment binding deployable truss structure element 15 is constituted by radially binding vertical members 4 of two adjacent side structures 3 which synchronously operate as shown in FIGS. 6A and 6B via three vertical member binding blocks 19 and a vertical member binding block 20. The side structures of the segment binding deployable truss structure 15 may be the same as the side structures constituting the segment, but in order to support the segment, the stiffness of the side structures of the segment binding deployable truss structure is required to be larger than that of the side structures constituting the segment.

Figure 7:
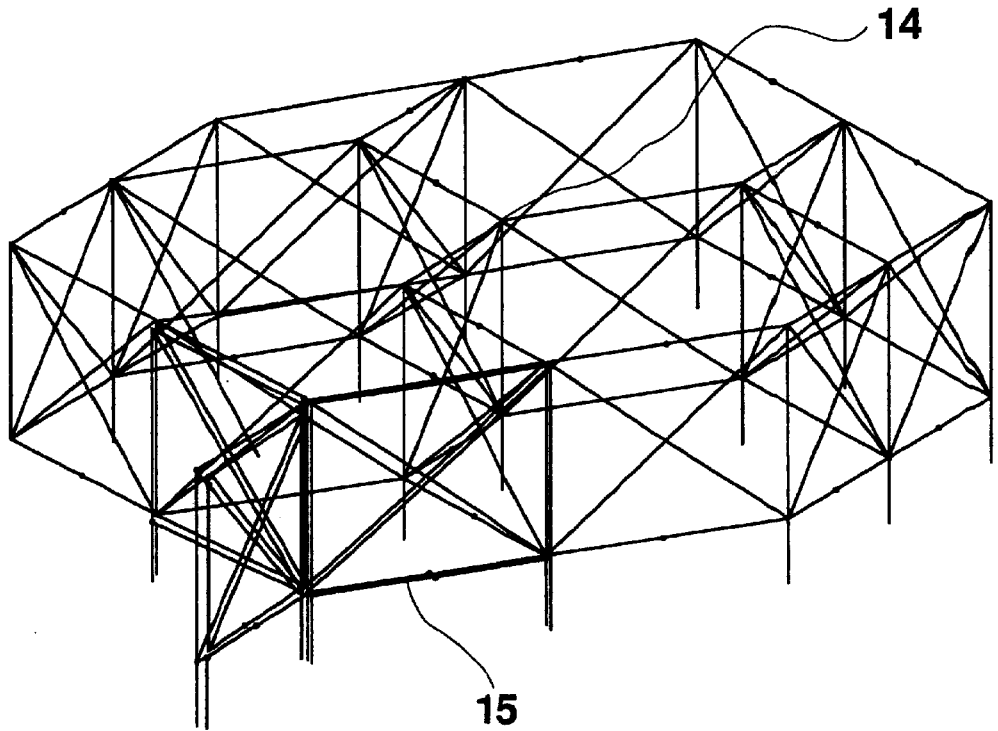
FIG. 7 is a constitutional view of a structure in which the segment and the segment binding deployable truss structure element are combined.
Figure 8:
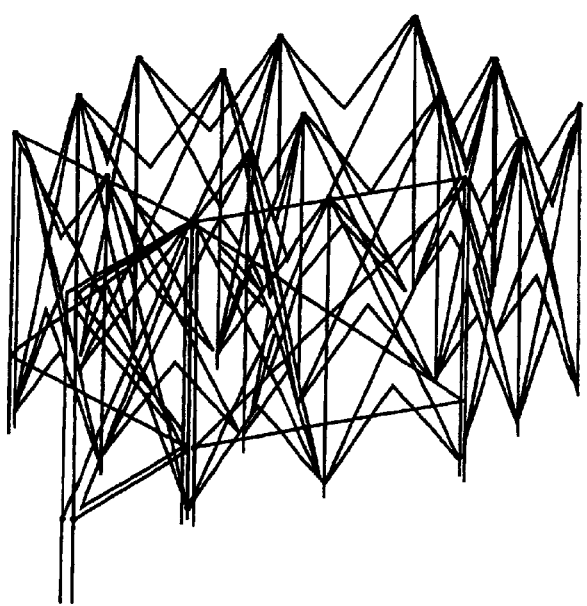
FIG. 8 is a constitutional view of a structure in which the segment and the segment binding deployable truss structure element are combined, and a formation in the middle of deployment is shown.

FIG. 7 shows a state where the segment binding deployable truss structure 15 is bound to a recess on the outer periphery of the segment 14 in which three hexagonal pillar cells 2 and two tetragonal pillar cells 17 are combined. Among the side structures constituting the segment binding deployable truss structure 15, two side structures directly bound to the segment 14 are bound thereto, holding the vertical members 4 of the side structures of the bound segment 14 and the slide hinges 9 in common, and they move synchronously with all the side structures constituting the segment. Furthermore, FIG. 8 shows a formation in the middle of the deployment of the segment 14 in which three hexagonal pillar cells and two tetragonal pillar cells 17 are bound to each other, and the segment binding deployable truss structures 15 are bound thereto. As shown in the same drawing, the dividable asynchronous deployable truss structure 13 carries out the deploying operation as one deployment unit comprising the segment 14 and the segment binding deployable truss structure 15 directly bound thereto independently in succession for every deployment unit.

As described above, the deployable truss structure of this embodiment can carry out the deployment as one deployment unit comprising the segment constituted of a plurality of the cells and two side structures in the segment binding deployable truss structure 15 directly bound thereto for every deployment unit, and the number of the mechanical parts involved in one deploying operation can therefore be decreased. In consequence, a movement reliability of the mechanism in outer space which would be extremely difficult for a person to repair can be ensured, whereby the enlargement of the structure for use in space can easily be accomplished.

Furthermore, a development test can be carried out for every deployment unit of the deployable truss structure to which the segment and the segment binding deployable truss structure are bound. In the test of the space structure on earth, there is a tendency, as the size of a specimen increases, for test facilities to become large in scale and for test evaluation to become complex. Therefore, it leads to the simplification of a test operation, a reduction in labor, decrease in costs, and space saving, for the test for every structure having a relatively small size such as one deployable unit structure. Particularly in the case where an deploying property test is made, it is unnecessary to perform an influence evaluation between the adjacent deployable unit structures, and the test evaluation of the deployment unit itself is enough and a relatively easy test is possible.

In the case where the scale of the deployable truss structure is increased, this scale increase can easily be accomplished simply by adding some segments and segment binding deployable truss structures. In addition, if the deployment reliability of the deployment unit in which the segments and the segment binding deployable truss structures are bound to each other is ensured, it is unnecessary to evaluate the deployment properties of the whole deployable truss structure newly constituted by the scale increase.

EMBODIMENT 2

The constitutional factors of a dividable asynchronous deployable truss structure of Embodiment 2 are the same as those of a dividable asynchronous deployable truss structure regarding Embodiment 1. However, with regard to side structures 3 constituting the dividable asynchronous deployable truss structure of Embodiment 2, a tetragonal portion surrounded by an upper foldable member 5 and a lower foldable member 12 constituting each side structure 3 and two vertical members 4 is made trapezoidal by altering a length of the upper foldable member 5 and a length of the lower foldable member 12, and the side structures are then bound to each other in a circular form to obtain a cell structure having a trapezoidal shape. The dividable deployable truss structure of Embodiment 2 is constituted of a plurality of cell structures having the trapezoidal shape. FIG. 16 shows the deployable truss structure of this embodiment.

Figure 16A:
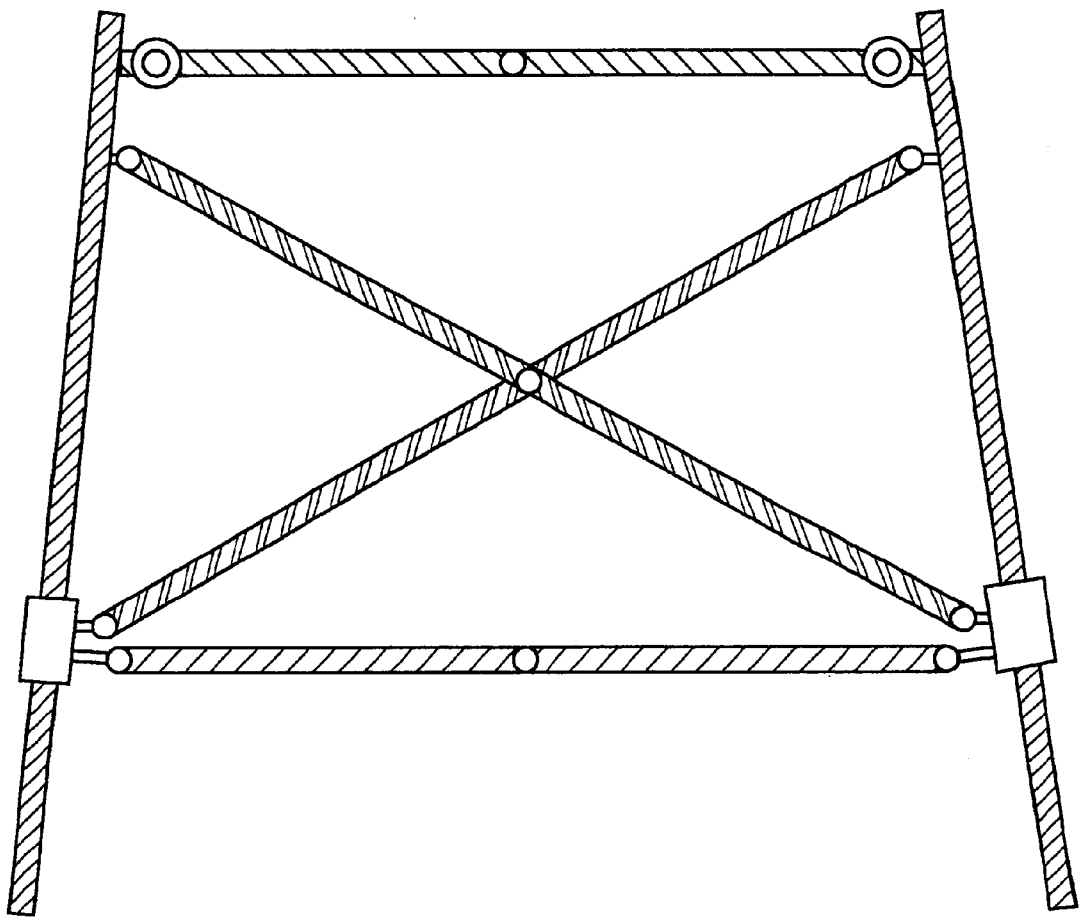
FIG. 16A is a constitutional view of the side structure of a dividable non synchronous deployable truss structure according to another embodiment of the present invention.
Figure 16B:
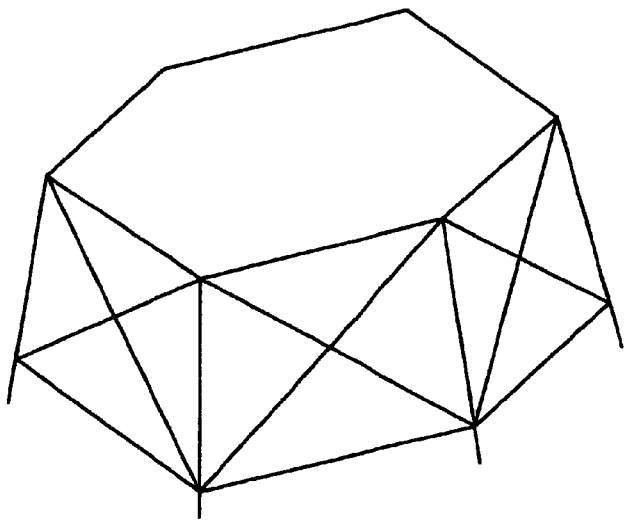
FIG. 16B is a constitutional view of a hexagonal pillar cell of a dividable non synchronous deployable truss structure according to another embodiment of the present invention.
Figure 16C:
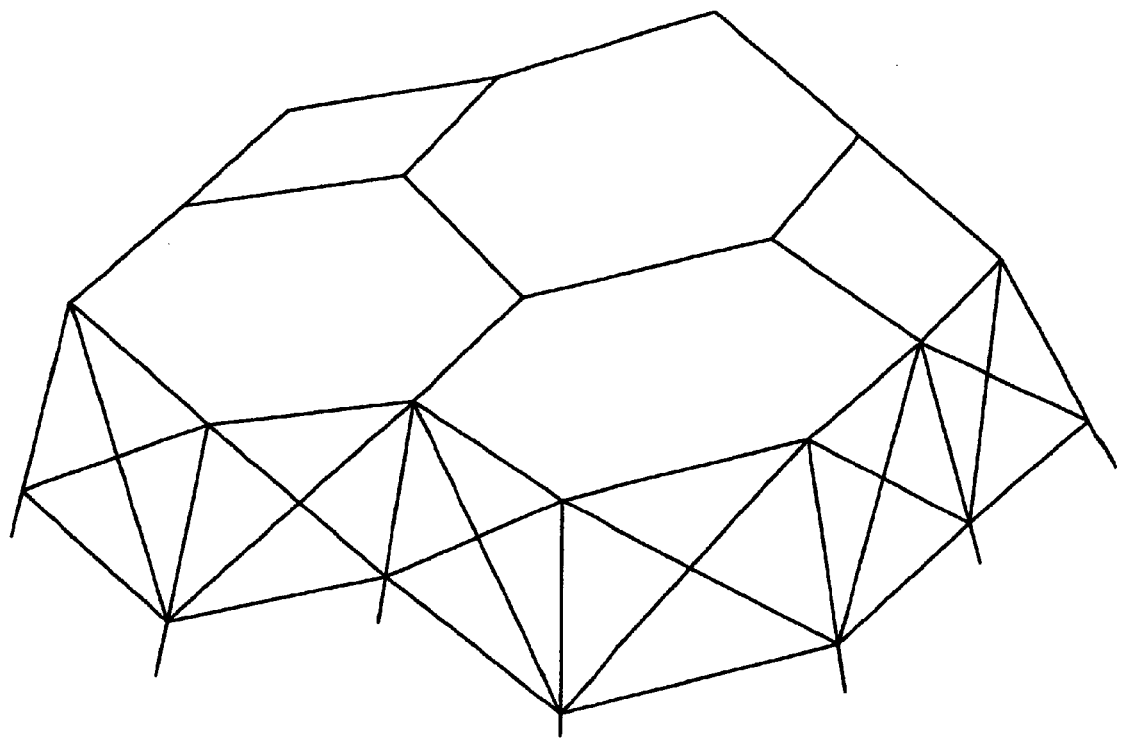
FIG. 16C is a constitutional view of a segment structure of a dividable non synchronous deployable truss structure according to another embodiment of the present invention.

FIGS. 16A to 16C show the deployable truss structure of this embodiment. Specifically, FIG. 16A shows the side structure; FIG. 16B shows the cell structure; and FIG. 16C shows the segment structure.

According to this embodiment, the structure can possess curvature after the deployment. Therefore, the deployable truss structure can be used to easily constitute an antenna.

EMBODIMENT 3

The constitutional factors of a dividable asynchronous deployable truss structure of Embodiment 3 include a segment binding mechanism 16 after deployment in addition to the constitutional factors of a dividable asynchronous deployable truss structure of Embodiment 1 or 2. FIG. 1 shows an installation position of the segment binding mechanism 16 after the deployment in the whole structure. The segment binding mechanism 16 after the deployment is located on a vertical member 4 of the side structure 3 which is present at the position closest to an adjacent segment and which is arranged on the outer periphery of a dividable asynchronous deployable truss structure 13, among side structures 3 constituting a segment structure 14. Furthermore, the segment binding mechanism 16 deploys as one deployment unit comprising the segment structure 14 and two side structures 3 in a segment binding deployable truss structure 15 directly bound thereto in succession for every deployment unit, and it is then mechanically bound to a vertical member 4 of the side structure 3 of the adjacent segment structure 14.

Figure 9:
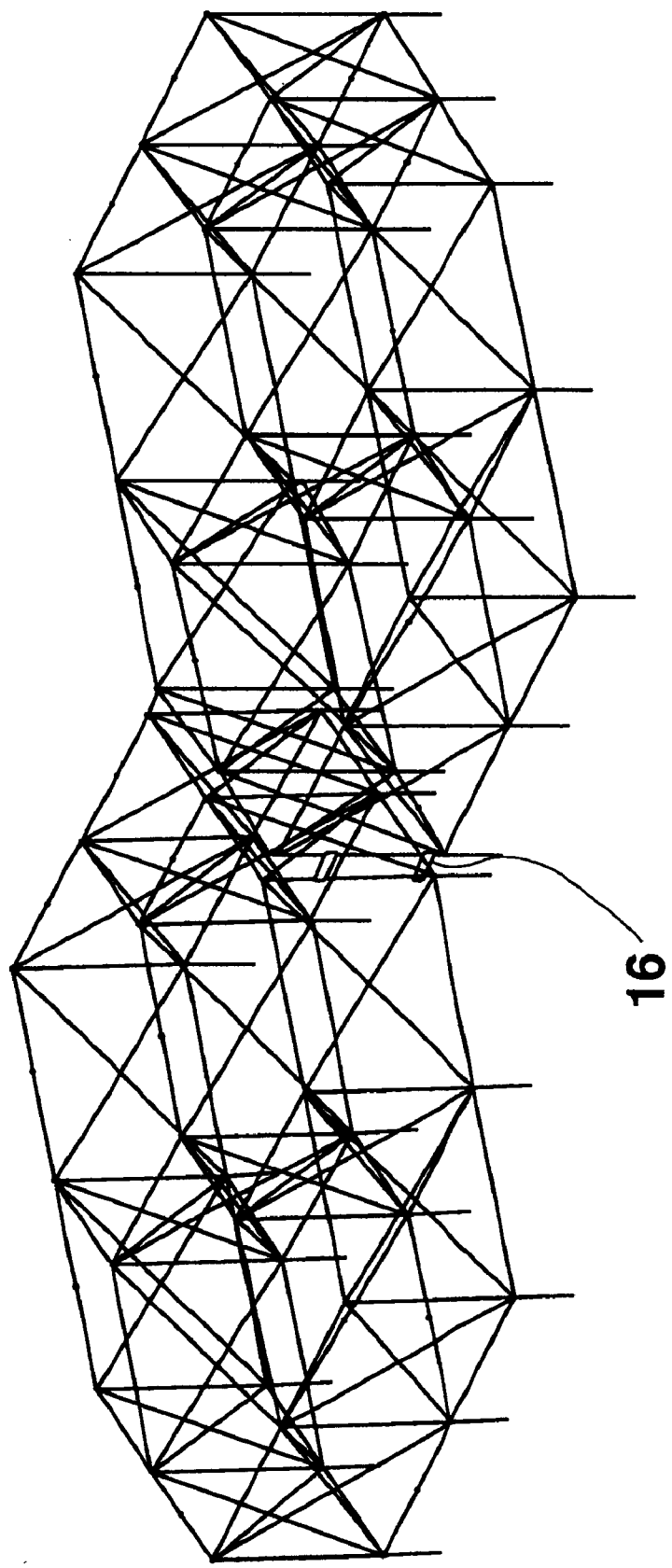
FIG. 9 shows an attachment position of segment binding mechanisms after the deployment.
Figure 10A:
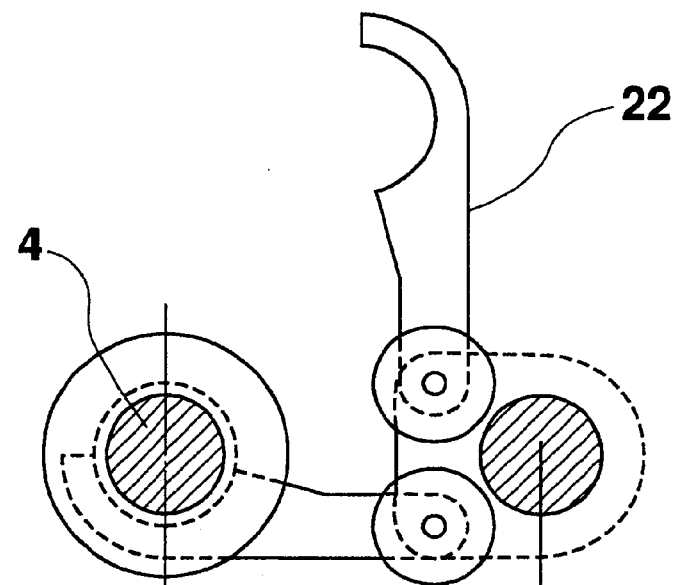
FIG. 10A is a sectional view of the segment binding mechanism after the deployment.
Figure 10B:
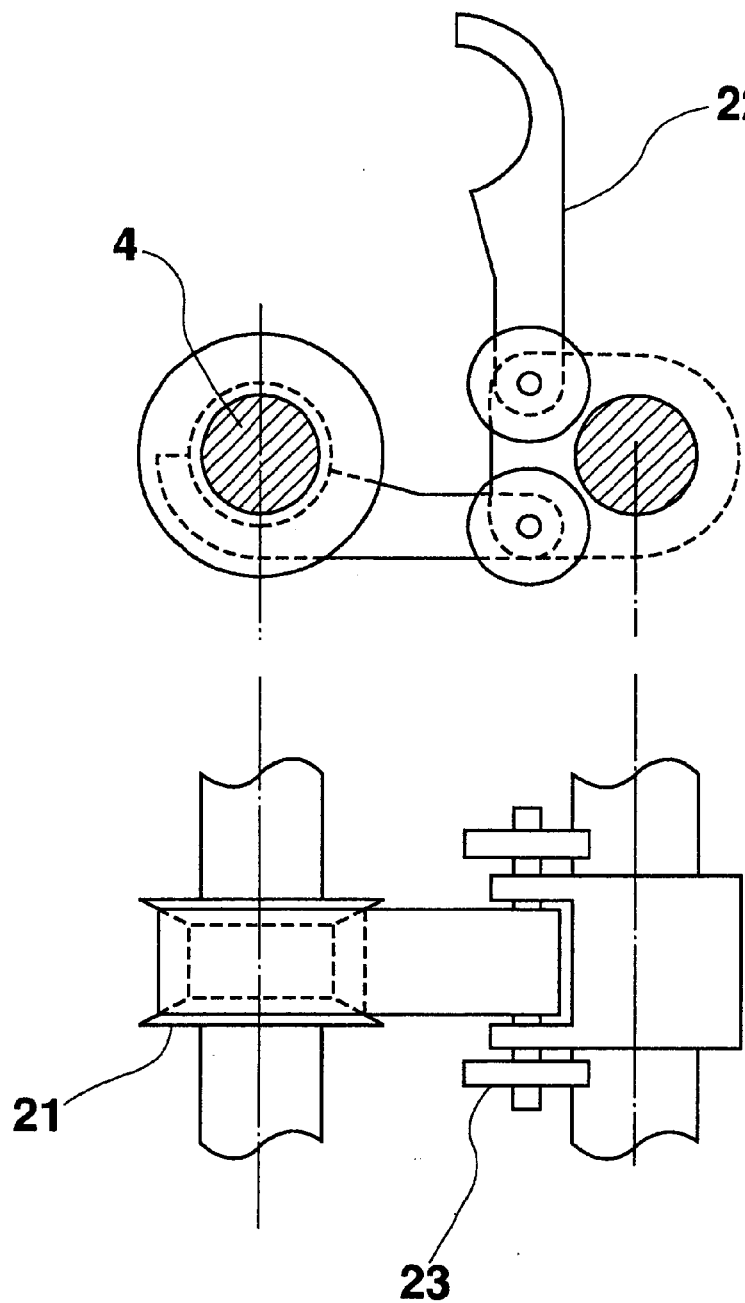
FIG. 10B is a side view of the segment binding mechanism after the deployment.

FIG. 9 shows a position of the segment binding mechanism 16 after the deployment which is bound to the segment 14. As shown in the same drawing, the segment binding mechanism 16 after the deployment is located on the vertical member 4 of the side structure 3 of the adjacent segment structure 14. FIGS. 10A and 10B show a detailed view of the segment binding mechanism 16 after the deployment. As shown in FIGS. 10A and 10B, a grooved fitting 21 having a v-shaped groove is attached to the vertical member 4 on the outer periphery of one segment of the two adjacent segments. After deployment is independently carried out for every deployment unit including the respective segments, two segment binding fittings 22 are rotated by a helical spring 23 to be bound to the grooved fitting, whereby the adjacent segments are bound to each other.

According to this embodiment, the segment binding mechanism after the deployment is used, whereby improvement of the stiffness of the whole deployable truss structure can be achieved, and a highly accurate position control and the security of a position accuracy of the large structure in outer space can easily be accomplished.

What is claimed is:

1. An deployable truss structure which comprises:

a plurality of segments constituted by binding a plurality of hexagonal pillar cells each comprising six side structures which are foldable in one plane and which are bound to each other in a circular form, to a plurality of tetragonal pillar cells each comprising four side structures which are foldable in one plane and which are bound to each other in a circular form, and a binding deployable element for binding a plurality of the segments to each other, wherein the deployable truss structure deploys one of the segments and the binding deployable truss structure as one independent deployable unit.

2. A structure according to claim 1, wherein the segment holds the side structures of the mutually adjacent hexagonal pillar cells in common and holds the mutually adjacent hexagonal pillar cells and the side structures of the tetragonal pillar cells in common.

3. A structure according to claim 1, wherein the segments have a hexagonal pillar shape.

4. A structure according to claim 1, wherein the binding deployable element is constituted by radially binding three pairs of two adjacent side structures, and binds three segments.

5. A structure according to claim 1, further comprising:

an deployable mechanism for mechanically binding the adjacent segments to each other after deployment.

6. A structure according to claim 1, wherein the segment holds the side structures of the mutually adjacent hexagonal pillar cells in common and holds the mutually adjacent hexagonal pillar cells and the side structures of the tetragonal pillar cells in common, the binding deployable element is constituted by radially binding six side structures, and binds two side structures to the edge of the one segment to thereby bind three segments, the one segment and the binding deployable element constitute one independent deployable unit, and the deployable truss structure asynchronously deploys every deployable unit.

7. An deployable truss structure which comprises:

a plurality of segments constituted by binding a plurality of hexagonal trapezoid cells each comprising six side structures which are foldable in one plane and which are bound to each other in a circular form, to a plurality of tetragonal trapezoid cells comprising four side structures which are foldable in one plane and which are bound to each other in a circular form, and a binding deployable element for binding a plurality of the segments to each other, wherein the deployable truss structure deploys one of the segments and the binding deployable element as one independent deployable unit.

8. A structure according to claim 7, wherein the segment holds the side structures of the mutually adjacent hexagonal trapezoid cells in common and holds the mutually adjacent hexagonal trapezoid cells and the side structures of the tetragonal trapezoid cells in common.

9. A structure according to claim 7, wherein the segments have a hexagonal trapezoid shape.

10. A structure according to claim 7, wherein the binding deployable element is constituted by radially binding three pairs of two adjacent side structures, and binds three segments.

11. A structure according to claim 7, further comprising:

an deployable mechanism for mechanically binding the adjacent segments to each other after deployment.

12. A structure according to claim 7, wherein the segment holds the side structures of the mutually adjacent hexagonal trapezoid cells in common and holds the mutually adjacent hexagonal trapezoid cells and the side structures of the tetragonal trapezoid cells in common, the binding deployable element is constituted by radially binding six side structures, and binds two side structures to the edge of the one segment to thereby bind three segments, the one segment and the binding deployable element constitute one independent deployable unit, and the deployable truss structure asynchronously deploys every deployable unit.

* * * * *